United States Patent [19]

Krowl

[11] Patent Number: 4,509,358
[45] Date of Patent: Apr. 9, 1985

[54] URETHANE DIES

[75] Inventor: William G. Krowl, Roseville, Mich.

[73] Assignee: Chrysler Corporation, Highland Park, Mich.

[21] Appl. No.: 593,449

[22] Filed: Mar. 26, 1984

[51] Int. Cl.[3] .......................... B21C 3/02; B29C 1/00; B29C 27/00
[52] U.S. Cl. ......................................... 72/476; 29/445; 29/458; 72/465; 76/101 R; 76/107 R; 76/DIG. 6; 76/DIG. 7; 156/245; 249/134; 249/175; 264/137; 264/219; 264/225; 264/258; 428/242; 428/423.1
[58] Field of Search ............... 264/219, 225, 258, 136, 264/137; 29/445, 458; 76/DIG. 6, DIG. 7, 107 R, 101 R; 428/242, 253, 329, 328, 423.1, 484; 249/134, 175; 72/465, 476

[56] References Cited

U.S. PATENT DOCUMENTS

| 2,005,591 | 6/1935 | Meyercord | 76/DIG. 6 |
| 3,005,491 | 10/1961 | Wells | 249/134 |
| 3,101,065 | 8/1963 | Kalis | 76/107 R |
| 3,313,007 | 4/1967 | James et al. | 249/134 |
| 3,317,178 | 5/1967 | Kreier et al. | 249/134 |
| 3,422,663 | 1/1969 | James et al. | 76/107 R |
| 3,427,689 | 2/1969 | Windecker | 249/134 |
| 3,463,035 | 8/1969 | Bright | 76/107 R |
| 3,773,879 | 11/1973 | Munsil et al. | 249/134 |

Primary Examiner—Willard E. Hoag
Attorney, Agent, or Firm—Mark P. Calcaterra

[57] ABSTRACT

A forming tool made from resins and fillers for the cold forming of sheet metal and especially suitable for forming short runs of sheet metal parts with drop hammers, hydraulic presses or mechanical crank presses, the filler being a mixture of iron filled resin and an aggregate; the aggregate being a lightweight by-product of the steel making process.

8 Claims, 3 Drawing Figures

4 Parts Aggregate To 1 Part Iron Filled Resin (46)
Top Ply Of Heavy Cloth (42) Also Impregnated With Iron Filled Resin (44)
4 Ply Heavy Cloth And Aluminum Filled Resin (42)

2 Ply Light Cloth And Urethane (40)

2 Ply Open Weave Cloth And Urethane (38)

2 Urethane Face Coats (36)

Sheet Wax Equal To Metal Thickness (34)

Wood Pattern (32)

4,509,358

URETHANE DIES

BACKGROUND AND SUMMARY OF THE INVENTION

This invention relates to a forming tool made from resins and fillers for the cold forming of sheet metal. It is especially suitable for forming short runs of sheet metal parts with drop hammers, hydraulic presses or mechanical crank presses.

More specifically, the forming tool described herein provides for a lightweight replacement to the traditional kirksite or aluminum dies used for forming short runs of sheet metal parts.

Traditional methods for making short run dies not only involve the use of heavy materials, but necessarily involve lengthy procedures to make the dies.

Attempts to use a substitute for the traditional methods have employed laminates coupled with cores of epoxy resin blended with various aggregates, such as aluminum, crushed rock or other inorganic materials.

This type of die construction has mostly been used for vacuum forming molds, prototype injection dies and limited run compression mold dies. However, the successful application of this process in a heavy environment, such as the automotive industry, has generally been unsuccessful. A description of some of the uses of plastic tools and their methods of fabrication is contained in the proceedings published as a result of the "Tenth Annual Seminar On Plastics for Tooling" given at Purdue University on June 12th and 13th, 1968; more specifically, an article by L. E. Winter entitled "Types of Plastic Tools and Methods of Fabrication" which can be found on page 65 of the proceedings of the tenth annual seminar. Also of interest is U.S. Pat. No. 4,125,351 to Alfter, et al.

It has been discovered that the element of the plastic tool which is most critical is the aggregate employed in the reinforcement core of the laminated die. Different aggregates have been employed ranging from popped popcorn to gravel. The discovery of an ideal material for a heavy-duty industrial purpose plastic tool has gone undetected for many years. Recently, a lightweight slag was used as an aggregate in the abovedescribed process. The slag is a by-product of making steel and is a combination of silica, aluminum oxide, and lime. During the steel making process, the slag exists as a white frothy hot fluid and the particular slag employed in the subject process is formed by forcing air into the fluid slag to cool it. In addition to cooling the fluid slag, the air shapes the slag into aggregate. The aggregate formed is irregular in shape and usually contains at least one air pocket or void.

Utilization of this lightweight, inexpensive, porous, and strong byproduct of the steel making process is the key to successful use of plastic tool forms in a heavy environment such as the short run of prototype automotive sheet metal parts.

DESCRIPTION OF THE DRAWINGS

Other objects, features and advantages of the present invention will become more fully apparent from the following detailed description of the preferred embodiment, the appended claims and the accompanying drawings in which:

DETAILED DESCRIPTION OF THE PREFERRED EMBODIMENT

Figure 1:
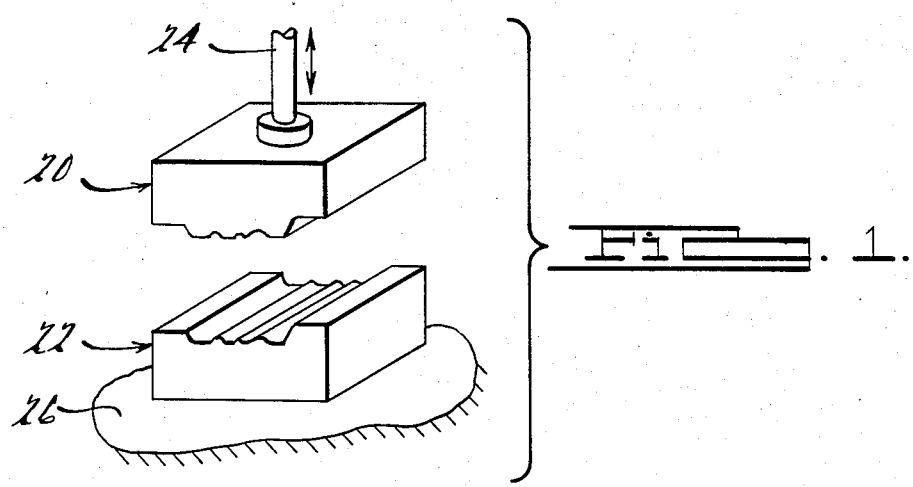
FIG. 1 is an isometric view of the male and female portions of a tool form used to form sheet metal parts installed on a tool forming machine.

Referring to FIG. 1, a tool forming machine is illustrated having a movable portion 24 and a stationary portion 26. Affixed to the movable portion 24 is one-half of a tool form 20 which in the preferred embodiment is the male tool form. Available for mating with the movable tool form 20 is a stationary tool form 22, in the preferred embodiment, this is the female half of the form. A piece of sheet metal (not shown) would be placed on the female form 22 and the male form 20 would be impressed down onto the female form 22 trapping the sheet metal therebetween. Thus, the sheet metal is formed into a piece having the shape outlined on the tool forms. The subject invention deals with the composition of the tool form halves 20 and 22.

Figure 2:
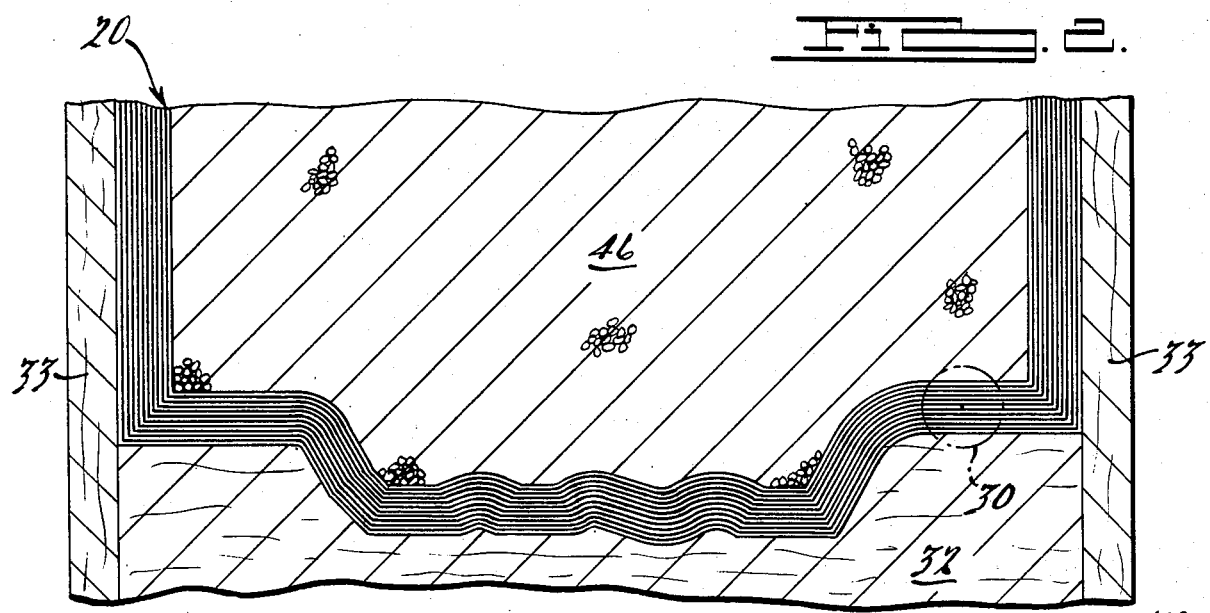
FIG. 2 is a cross sectional view of the plastic tool form after it has been made, but before installation on a tool forming machine such as that shown in FIG. 1.
Figure 3:
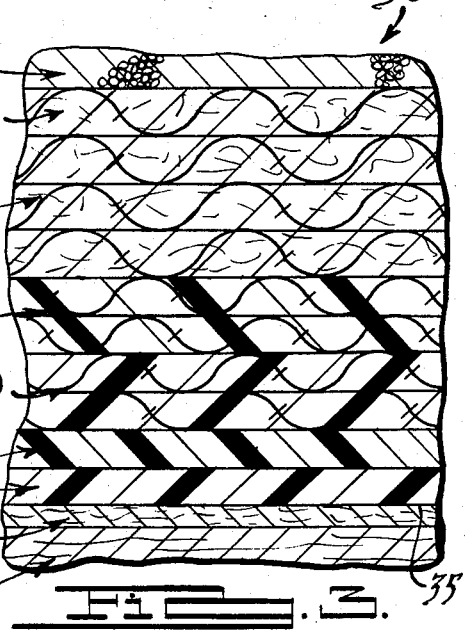
FIG. 3 is a more detailed cross sectional view of the various layers contained in the tool form shown in FIG. 2.

The tool form, according to the subject disclosure and the method to make it, will be described by reference to FIG. 2 and FIG. 3. The particular tool form half shown is a cross section of the male tool form 20 shown in FIG. 1. FIG. 3 is merely an expanded view of the cross section of each layer shown in the outline circle 30 of FIG. 2.

The process is begun by making an inside metal wood pattern 32. In this case the wood pattern represents the female half of the wood form. Affixed to the sides of the wood pattern 32 are side walls 33; usually plywood will suffice. For the particular application disclosed herein, the side walls should be at least five inches higher than the peak of the wood pattern 32. It has been found that the volume thus created will provide sufficient strength to the tool form.

A sheet wax layer 34 is next applied to the inside metal wood pattern 32. The sheet wax layer is applied in the thickness of the metal to be formed with the tool form. The sheet wax surface is then treated with a release agent so that after the tool form is made, the tool form, when separated from the wood pattern 32, will leave the sheet wax layer in place on the wood pattern 32. The sheet wax layer is readily peeled off after making the tool form.

Two layers of urethane face coats 36 are applied, the first to the sheet wax surface, and the second to the first layer of urethane after tacking. Two layers of open weave cloth 38 are then wetted with urethane into the previous layers of urethane. The cloth is butted into the edges in the surface created by the wood pattern so as to create its image with as little distortion as possible.

Next, two layers of light cloth 40 are wetted with urethane into the previous layers of urethane and open weave cloth. Next, four layers of heavy cloth 42, each wetted with aluminum resin are sequentially layered onto the previous light cloth layers. As the forming surface 35 is now defined, butting the edges of the heavy cloth is not necessary. Wetted into the fourth layer of heavy cloth and aluminum resin is an application of iron-filled resin 44.

The cavity formed by the side walls and the layered surfaces is now filled with a mass cast core 46 made up of four parts aggregate mixed with one part of iron filled resin. After curing, the side walls 33 and inside metal wood pattern 32 are removed. The core 46 of the tool form 20 is mounted to the movable portion 24 of the forming machine to form the sheet metal parts.

While the present invention has been disclosed in connection with the preferred embodiment thereof, it should be understood that there may be other embodiments which fall within the spirit and scope of the invention and that the invention is susceptible to modification, variation and change without departing from the proper scope and fair meaning of the following claims.

I claim:

1. A laminated forming tool with a work contact surface, tool sides and a base made from resins and fillers for the cold forming of sheet metal, especially suitable for forming short runs of sheet metal parts with drop hammers, hydraulic presses or mechanical crank presses and the like which comprises:

two layers of urethane on the tool sides and adjacent the contact surface;
   two layers of loose-knit cloth each impregnated into two more urethane layers;
   a first layer of thin, tight-knit cloth impregnated into another urethane layer;
   a second layer of thin, tight-knit cloth impregnated with aluminum filled resin and layered onto the first layer of thin, tight-knit cloth;
   three layers of thick, tight-knit cloth each impregnated with aluminum filled resin and layered onto the second layer of thin, tight-knit cloth;
   a fourth layer of thick, tight-knit cloth layered onto the other three layers of thick tight-knit cloth and impregnated with iron filled resin;
   a mass cast core comprising four parts aggregate mixed with one part iron filled resin formed onto the fourth layer of thick, tight-knit cloth, the core having a surface at the cloth and a free surface;
   a base affixed to a free surface of said core available for mounting purposes on a machine to press or form the sheet metal parts.

2. The forming tool of claim 1 where the aggregate comprises a slag, a byproduct of the steel making process.

3. The forming tool of claim 2 where the slag further comprises silica, aluminum oxide and lime.

4. The forming tool of claim 3 where the slag further comprises the aggregate formed by the injection of air into a hot fluid comprising silica, aluminum oxide and lime.

5. A method of making a laminated forming tool, with a contact surface, tool sides and a base, from resins and fillers, for the cold forming of sheet metal, especially suitable for forming short runs of sheet metal parts with drop hammers, hydraulic presses or mechanical crank presses and the like which comprises:

affixing wood walls to an inside metal wood pattern such that the walls exceed the height of the peak on the pattern;
   sheet waxing the wood pattern to a thickness equal to the thickness of the metal to be formed;
   spraying the sheet wax surface with a release agent for communication with urethane;
   applying a first layer of urethane to the sheet wax surface and to the side walls;
   applying a second layer of urethane to the first layer when the first layer tacks;
   applying two layers of loose-knit cloth wetted into two new layers of urethane, butting the cloth into the edges of the surface created by the wood pattern;
   applying a first layer of thin, tight-knit cloth wetted into another layer of urethane onto the loose-knit cloth layer;
   applying a second layer of thin, tight-knit cloth wetted into a layer of aluminum filled resin onto the first thin, tight-knit layer;
   applying four layers of thick, tight-knit cloth each wetted into layers of aluminum resin, all four sequentially layered onto the second layer of thin, tight-knit cloth;
   wetting to the fourth layer of thick, tight-knit cloth with iron filled resin;
   filling the cavity formed by the side walls and the wood pattern with a mass cast core comprising four parts aggregate mixed with one part iron filled resin; curing said resin and
   attaching a base to the core for mounting the tool to a machine to press or form the sheet metal parts.

6. The method of claim 5 where the aggregate comprises a slag, a byproduct of the steel making process.

7. The method of claim 6 where the slag further comprises silica, aluminum oxide and lime.

8. The method of claim 7 where the slag further comprises the aggregate formed by the injection of air into a hot fluid comprising silica, aluminum oxide and lime.

* * * * *